Dec. 30, 1924.
B. F. W. HEYER
1,520,865
APPARATUS AND METER FOR TESTING BATTERIES
Filed Sept. 21, 1922
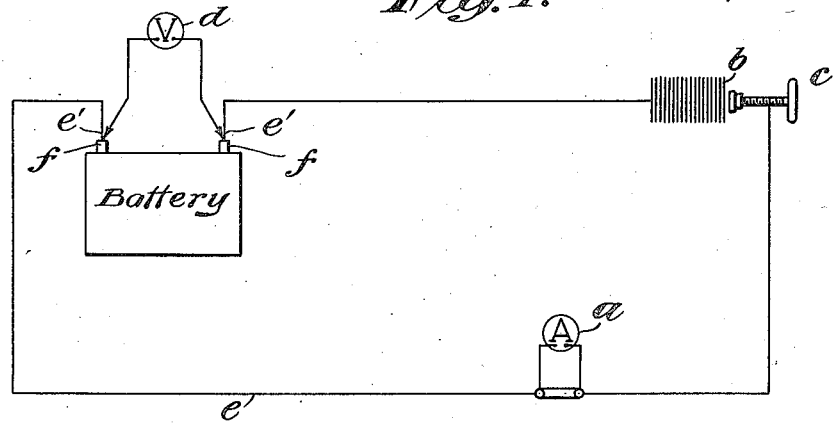
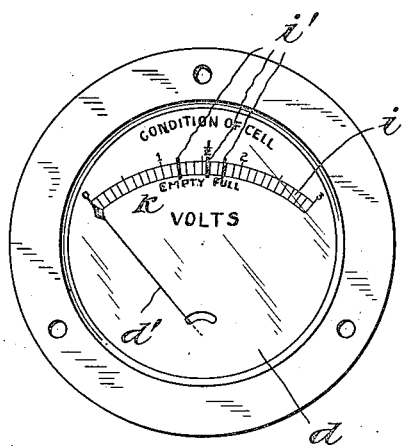
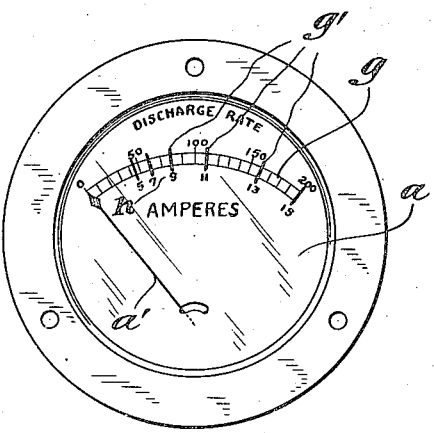
INVENTOR
Benjamin F. W. Heyer
BY Redding & Greeley
ATTORNEY Patented Dec. 30, 1924.

1,520,865

UNITED STATES PATENT OFFICE.

BENJAMIN F. W. HEYER, OF MONTCLAIR, NEW JERSEY.

APPARATUS AND METER FOR TESTING BATTERIES.

Application filed September 21, 1922. Serial No. 589,565.

*To all whom it may concern:*

Be it known that I, BENJAMIN F. W. HEYER, a citizen of the United States, residing in the city of Montclair, in the State of New Jersey, have invented certain new and useful Improvements in Apparatus and Meters for Testing Batteries, of which the following is a specification, reference being had to the accompanying drawings, forming a part hereof.

This invention relates to meters and self-contained apparatus for testing high rate discharging batteries by the drop test method. More particularly, it is concerned with the provision of apparatus for conducting such tests in service stations on starter batteries for motor vehicles.

Batteries as designed vary generally in the number of plates and the ampere hour capacity. Such batteries are designed for use at high rate discharges having certain predetermined maximum amperage. At a given rate of discharge batteries have a known voltage drop due to the internal resistance and this drop varies with the discharge rate and, as between different batteries, with the capacity. By tests, tables have been compiled which indicate, for batteries of different characteristics, depending on the number of plates or the capacity in ampere hours, the normal voltage drop at any given discharge rate. A careful tester should employ these tables and, during the test, limit the discharge to the maximum rate for the particular battery under test and determine the voltage drop for such battery at several stages in the charging as for instance, when one-half charged and fully charged, the voltage drop for the particular battery under test at the given discharge rate bearing in accordance with the drops previously ascertained by test. It is a fact, however, under service station conditions, that the average tester not only does not carefully limit the discharge rate to the maximum intended for the particular battery but his tests are not thoroughly made at different stages of charging with respect to the voltage drop shown by the prepared tables to be expected at the given discharge rate at various stages of charging for the particular battery. Further, no means has ever been provided by which the car owner might observe for himself the conditions under which the charging is being carried on.

The principal object of the present invention is to provide a complete self-contained apparatus which will facilitate the work and observations of the tester and will present to him without reckoning on his part readings showing not only the proper discharge rate for the battery under test but the voltage drop to be expected for that battery at different stages of the charging. The apparatus and meters provided therefor are so constructed and mounted as to be observable and readable by the owner of the car so that he likewise may have indicated in simple form the charging conditions prevailing at any time.

In accordance with the invention it is proposed to connect in circuit in the apparatus an ammeter, an adjustable resistance, and a volt meter to indicate the drop across the battery, and convenient connections by which the battery may be readily placed in circuit without delay. The meters provided are of novel construction having their scales so calibrated with reference to each other that the discharge rate for batteries of different characteristics may be read off and the voltage drop for each such battery read off at various stages of charging. Accordingly, the invention is concerned generally not only with the apparatus by which the testing is carried on but also with the meters from which readings are taken.

The invention will be described with particular reference to the accompanying drawings in which:

Figure 1 is a schematic view showing the wiring of the units, the apparatus in commercial form being self-contained with the units and the wiring carried preferably on a single panel.

Figure 2 is a view in elevation of the improved volt meter.

Figure 3 is a similar view of the improved ammeter calibrated for use with the volt meter shown in Figure 2.

The present invention, while not to be limited in any of its phases to use under any particular conditions, will probably find its broadest application to the testing of starter batteries for motor vehicles in service stations and, accordingly, the description will be given with reference to such use.

Starter batteries for motor vehicles generally have high discharge rates, the maximum for any particular battery being of predetermined amperage. In making tests on such batteries best results are obtained where the discharge rate is maintained at the same point as the battery encounters under actual service conditions. It is known that at such a given discharge rate the internal resistance of the battery is such as to cause a voltage drop of a predetermined amount. This voltage drop at such a discharge rate for any particular battery will vary, of course, depending upon the condition of charge of the battery although the rate of variance for different batteries differs according to capacity. The ampere hour capacity of batteries varies, roughly, with the number of plates. Accordingly, tables have been compiled indicating for a battery of a given ampere hour capacity, that is, for a battery having a given number of plates the proper voltage drop at various stages of charge at the discharge rate for which the battery is designed. Loose results in battery charging come about through the failure or inability of the tester to use these tables intelligently. Further, no apparatus have ever been provided by which indications of the condition of charge are afforded for the car owner. In accordance with the present invention the necessity for using such tables or for reckoning at any stage of the drop test is obviated and indicating meters are mounted in such relation as to be readily observable by both the tester and the car owner and to indicate on their scales the condition of charge and the discharge rate for the particular battery under test.

Referring now to Figure 1 it will be seen that the circuit includes an ammeter $a$, a resistance pile $b$ adjustable manually through an operating wheel $c$, a volt meter $d$ and appropriate wiring $e$ for these various units. The ends $e'$ of the leads $e$ may be connected with the leads on the volt meter $d$ and are adapted for ready connection to the terminals $f$ of the battery under test. All of the units indicated may obviously be mounted on a single panel and a suitable bracket provided for support of the battery.

Reference is now to be had to Figures 2 and 3 for an understanding of the construction of the improved meters by which the desired results are obtainable. As shown in Figure 3 the ammeter $a$ has the usual indicating hand $a'$ movable across an indicating scale $g$ on the face of the meter. This scale is so calibrated as to indicate by heavy markings $g'$ the discharge rate for a battery of a given ampere hour capacity or, for convenience in practice, a battery having a given number of plates. It is recognized that for practicable purposes the ampere hour capacity of a battery may be considered as varying with the number of plates. The scale indications $g'$ on the face of the ammeter in Figure 3 show that a battery of, say five plates denoted on the lower scale $h$ has a discharge rate of forty-five amperes or, disregarding the exact reading, that a battery of five plates should be made to discharge with the indicating hand $a'$ in line with the first heavy marking $g'$. Similarly, the discharge rates for batteries of other capacity and having, say, seven, nine, eleven, thirteen or fifteen plates are provided on the scale.

Referring now to the volt meter $d$ illustrated in Figure 2 the hand $d'$ is adapted to move over the scale $i$ and indicate the voltage drop across the terminals $f$ of the battery under test. The scale $i$ is so calibrated as to indicate by heavy markings $i'$ the voltage drop to be expected when the battery under test is, say, empty, half charged, or fully charged when, and only when, it is discharging at its intended rate. For instance, when a battery is empty the voltage drop indicated at the first mark $i'$ has been determined by test to be one and two-tenths. However, it is not necessary to consider this reading in volts provided the scale is properly calibrated, the observer merely depending upon the series of heavy marks $i'$ at different conditions of charge as shown by the lower scale $k$.

In use, a battery is put on test by connecting the leads $e'$ with the terminals $f$. The resistance pile $b$ is then adjusted until the ammeter needle $a'$ registers with the appropriate discharge rate indication depending upon the ampere hour capacity of the battery, that is, the number of plates in the battery. This ampere hour capacity or the number of plates in the battery will always be known to the tester. If the number of plates be five, for instance, the resistance pile $b$ will be adjusted until the needle $a'$ registers with the mark opposite the numeral "5" of the scale $h$ on the ammeter. The drop indicated on the volt meter $d$ will be indicated by the hand $d'$. Calibration of the volt meter $d$ is such with respect to the ammeter $a$ that the observer will see from the face of the voltmeter that when the battery is fully charged the needle should register with the heavy marking $i'$ on the lower scale $k$, the discharge rate being maintained through adjustment of the resistance pile. Similarly, other batteries on test and having different capacity may be brought to the predetermined discharge rate and the charging continued until the voltage drop indicates that it is fully charged. The initial test of the battery at the predetermined discharge rate will show through the needle $d'$ the exact internal conditions.

As indicated hereinbefore, the lower scale on the ammeter might be calibrated in ampere hours but in practice the service man is more familiar with the number of plates in the battery and so, for convenience, the proper heavy markings are calibrated in plates. It will be understood that while the present apparatus and meters afford correct indications of charging conditions at all times a cross-check may be carried on by the tester by reference to the compiled tables hereinbefore referred to.

What I claim is:

1. Apparatus for testing batteries by the drop test method comprising in combination an ammeter, a volt meter and an adjustable resistance in circuit, said elements being connectible in circuit with the battery to be tested and with the volt meter across the battery terminals and indicia on the faces of the meters, to indicate without further reference the predetermined discharge rate of the battery on test and the condition of the battery.

2. Apparatus for testing batteries by the drop test method comprising in combination an ammeter, a volt meter and an adjustable resistance in circuit, said elements being connectible in circuit with the battery to be tested and with the volt meter across the battery terminals, calibrations on the faces of the meters, and indicia on the faces of, the meters to indicate without further reference the predetermined discharge rate for the battery on test having reference to its capacity and the voltage drop across the battery at such predetermined discharge rate having reference to its internal condition.

3. Apparatus for testing batteries by the drop test method comprising in combination an ammeter, a volt meter and an adjustable resistance in circuit, said elements being connectible in circuit with the battery to be tested and with the volt meter across the battery terminals and calibrations on the ammeter including heavy markings for batteries of varying numbers of plates and placed on the ampere scale at the proper point with reference to the desirable discharge rate for such batteries, respectively, and calibrations on the volt meter including heavy marks indicating the condition of the battery when discharging at the predetermined rate indicated on the ammeter.

4. In combination, an ammeter and a volt meter for the testing of batteries so calibrated as to indicate to the observer the condition of the battery through the voltage drop for a given rate of discharge, the face of the ammeter being provided with indicia for indicating without further reference the proper rate of discharge for a battery of given capacity.

This specification signed this 18th day of September, A. D. 1922.

BENJAMIN F. W. HEYER.